UNITED STATES PATENT OFFICE.

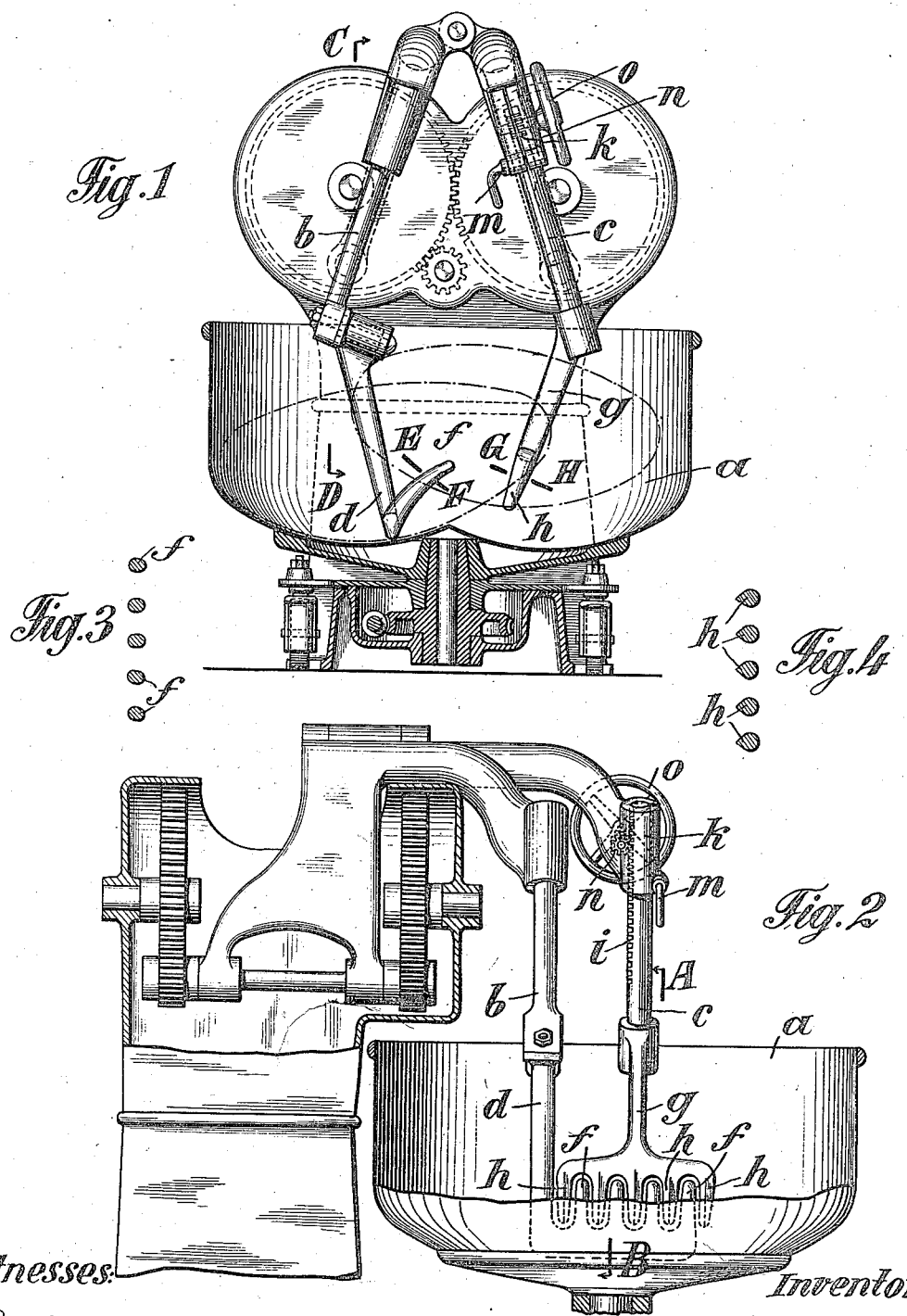

FRIEDRICH AESCHBACH, OF AARAU, SWITZERLAND.

KNEADING-MACHINE.

1,044,967.

Specification of Letters Patent.

Patented Nov. 19, 1912.

Application filed June 6, 1910. Serial No. 565,845.

*To all whom it may concern:*

Be it known that I, FRIEDRICH AESCHBACH, a citizen of the Republic of Switzerland, residing at Aarau, Switzerland, have invented certain new and useful Improvements in Kneading-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The subject of the present invention is a kneading machine, more particularly adapted for treating baker's dough.

By means of the new machine the dough is first divided, turned over and mixed, by means of two tools operating in counter-directions, this constituting the first stage of the treatment. Hereupon the material is drawn out and pommeled or kneaded by practically only one tool, which constitutes the second stage of the treatment. Thus, for the correct treatment of the dough, such as has hitherto only been properly performed by hand, the material is worked up by the machine in two separate operations or stages. That is to say, it is first torn apart, thrown over, and, especially the leaven, thoroughly mixed; whereupon the dough is so treated as to avoid tearing, but is drawn out and lifted, and the kneading operation thus completed.

My invention is illustrated in the accompanying drawing, which shows a preferred embodiment of machine, parts unnecessary for an explanation of the invention being omitted.

Figure 1 is a section on the line A—B of Fig. 2. Fig. 2 is a section on the line C—D of Fig. 1. Fig. 3 is a section on the line E—F of Fig. 1. Fig. 4 is a section on the line G—H of Fig. 1.

$a$ is a rotary trough of familiar form; $b$ and $c$ are two arms whose lower ends describe (in the construction illustrated) intersecting ellipses. To the arm $b$ there is secured a comb-shaped agitator or beater $d$, the prongs or teeth $f$ of which are bent in the direction of motion. These teeth are blunt in front, as can be seen from Fig. 3, and are therefore not themselves adapted to divide the tough dough, catch it up and mix it. To the arm $c$ a second comb-shaped beater $g$ is secured, whose prongs or teeth $h$ are so directed, that, on motion of the two beaters $d$, $g$ in the paths indicated by the broken-lines in Fig. 1, they can pass between the teeth $f$. The teeth $h$, as Fig. 4 shows, are sharp in front, and are thus suited to cut or divide the dough. Owing to the mutual engagement of the two beaters, a shearing effect will be produced, whereby the leaven is thoroughly torn asunder and mixed, such as is necessary during the first stage of working.

The arm $c$ has a rack portion $i$, and moves in a split guide $k$, having a screw $m$, whereby the arm $c$ can be clamped in the desired position. With the rack part $i$ there meshes a pinion $n$, operable by a handwheel $o$. In this manner the beater $g$ may be gradually elevated, whereby the cutting effect can be slowly reduced, until total cessation. When the beater $g$ has been thus elevated above the teeth $f$, the shearing motion of the two beaters stops and the beater $g$ no longer operates on the dough. The beater $d$, with its blunt teeth $f$, now continues to work alone on the material, which therefore is now only drawn out and lifted.

Having now particularly described and ascertained the nature of the said invention and in what manner the same is to be performed, I declare that what I claim is:

1. In a kneading machine, a trough, two kneading arms therein, means arranged to move the arms in elliptical paths so that parts of the two arms pass each other in close proximity in counter directions from time to time to exert a shearing and mixing action on dough in the trough, and means to withdraw one of said arms from the dough whereby the remaining arm will not shear and mix, but draw and lift the dough.

2. In a kneading machine, a trough, two kneading arms therein mounted in parallel vertical planes, and means to move said arms in counter directed elliptical paths, the lower parts of said arms being arranged to pass each other in close proximity from time to time thereby exerting a shearing and mixing action on dough in the trough, and means to gradually withdraw one of said arms from the dough whereby the remaining arm will not shear and mix, but draw and lift the dough.

3. In a kneading machine, a trough, two kneading arms therein, one of said arms having blunt teeth formed thereon at an angle to the arm, the other arm having teeth in the plane of the arm and sharp on the inner side, means for moving the arms in elliptical paths and in counter directions whereby the teeth of both arms shear and mix dough in the trough, and means to withdraw the last named arm from the trough whereby the remaining arm will not shear and mix, but draw and lift the dough.

In testimony that I claim the foregoing as my invention, I have signed my name in presence of two subscribing witnesses.

FRIEDRICH AESCHBACH.

Witnesses:
 ERNST FISCHER,
 CARL GUBLER.